US006966149B2

(12) United States Patent
Fenelon

(10) Patent No.: US 6,966,149 B2
(45) Date of Patent: Nov. 22, 2005

(54) WINDOW BRACKET FOR A WINDOW LIFT MECHANISM

(76) Inventor: Paul J. Fenelon, 13 Inverary, Nashville, TN (US) 37215

( * ) Notice: Subject to any disclaimer, the term of this patent is extended or adjusted under 35 U.S.C. 154(b) by 0 days.

(21) Appl. No.: 10/400,820

(22) Filed: Mar. 27, 2003

(65) Prior Publication Data

US 2004/0187391 A1 Sep. 30, 2004

(51) Int. Cl.[7] .................................................. B60J 1/17
(52) U.S. Cl. ........................................... 49/375; 49/349
(58) Field of Search .......................... 49/375, 374, 372, 49/349, 348

(56) References Cited

U.S. PATENT DOCUMENTS

| | | | |
|---|---|---|---|
| 548,695 | A | 10/1895 | Capron |
| 1,356,123 | A | 10/1920 | Belle |
| 1,480,453 | A | 1/1924 | Lane |
| 1,487,926 | A | 3/1924 | Evans |
| 1,683,914 | A | 9/1928 | Pfiffer |
| 1,850,091 | A | 3/1932 | Bailey |
| 1,939,159 | A | 12/1933 | Atwood |
| 2,115,632 | A | 4/1938 | Hanley |
| 2,291,275 | A | 7/1942 | Ackerman |
| 2,293,968 | A | 8/1942 | Chandler |
| 2,319,088 | A | 5/1943 | Roethel |
| 2,336,530 | A | 12/1943 | Chandler et al. |
| 2,345,594 | A | 4/1944 | Gardner |
| 2,531,116 | A | 11/1950 | Donoghue |
| 2,883,780 | A | 4/1959 | Goodman |
| 2,899,832 | A | 8/1959 | Meyer |

(Continued)

FOREIGN PATENT DOCUMENTS

| | | |
|---|---|---|
| GB | 851436 | 10/1960 |
| JP | 5-86761 | 4/1993 |
| WO | WO96/41087 | 6/1995 |
| WO | WO97/37099 | 10/1997 |

OTHER PUBLICATIONS

Ford 1973 Car Shopt Manual, vol. 4, Body, Ford Marketing Corporation, Ford Customer Service Division, Service Technical Communications Dept., Dearborn, MI (printed Sep. 1972).

*Primary Examiner*—Gregory J. Strimbu
(74) *Attorney, Agent, or Firm*—Harness, Dickey & Pierce, P.L.C.

(57) ABSTRACT

A dual rack and pinion system for a window lift mechanism includes window brackets for simple mounting to a window. The system includes a modular frame design to improve assembly of the window lift mechanism into the door of a vehicle. An assembly method is provided for the dual rack and pinion system. The system is also provided with a smart motor and incorporates resilient shock absorbers in the dual rack and pinion gear train to allow more time for the smart motor to detect and react to an obstruction in the window.

6 Claims, 12 Drawing Sheets

U.S. PATENT DOCUMENTS

| | | | | | |
|---|---|---|---|---|---|
| 3,228,677 | A | * | 1/1966 | Martens | 49/41 |
| 3,591,982 | A | * | 7/1971 | Nantau | 49/227 |
| 3,659,466 | A | | 5/1972 | Pickles | |
| 3,706,163 | A | | 12/1972 | Pickles | |
| 3,706,236 | A | | 12/1972 | Pickles | |
| 3,736,702 | A | | 6/1973 | Pickles | |
| 3,868,788 | A | * | 3/1975 | Podolan | 49/374 |
| 4,082,008 | A | | 4/1978 | Kluting | |
| 4,119,341 | A | | 10/1978 | Cook | |
| 4,167,834 | A | | 9/1979 | Pickles | |
| 4,168,595 | A | | 9/1979 | Pickles et al. | |
| 4,170,847 | A | | 10/1979 | Pickles | |
| 4,182,078 | A | | 1/1980 | Bartholomew | |
| 4,229,906 | A | | 10/1980 | Pickles | |
| 4,235,117 | A | | 11/1980 | Pickles | |
| 4,299,057 | A | * | 11/1981 | Hagemann et al. | 49/375 |
| 4,328,451 | A | | 5/1982 | Barge | |
| 4,389,818 | A | | 6/1983 | Sakamoto | |
| 4,400,913 | A | | 8/1983 | Krantz et al. | |
| 4,420,906 | A | | 12/1983 | Pickles | |
| 4,534,233 | A | | 8/1985 | Hamaguchi | |
| 4,553,656 | A | | 11/1985 | Lense | |
| 4,575,967 | A | * | 3/1986 | Bickerstaff | 49/211 |
| 4,592,245 | A | | 6/1986 | Pickles | |
| 4,603,894 | A | | 8/1986 | Osenkowski | |
| 4,698,938 | A | | 10/1987 | Huber | |
| 4,770,055 | A | | 9/1988 | Chevance et al. | |
| 4,785,585 | A | | 11/1988 | Grier et al. | |
| 4,794,733 | A | * | 1/1989 | Kanemaru | 49/348 |
| 4,848,032 | A | * | 7/1989 | Ballor et al. | 49/350 |
| 4,850,636 | A | | 7/1989 | Mclaren et al. | |
| 4,878,396 | A | | 11/1989 | Grunberg | |
| 4,910,917 | A | | 3/1990 | Brauer | |
| 4,967,510 | A | | 11/1990 | Torii et al. | |
| 4,970,827 | A | | 11/1990 | Djordjevic | |
| 4,991,351 | A | * | 2/1991 | Bertolini | 49/351 |
| 5,000,055 | A | | 3/1991 | Kim | |
| 5,005,316 | A | | 4/1991 | Hornivius | |
| 5,022,184 | A | | 6/1991 | Yamamura et al. | |
| 5,174,066 | A | | 12/1992 | Dupuy | |
| 5,226,259 | A | | 7/1993 | Yamagata et al. | |
| 5,251,403 | A | | 10/1993 | Compeau et al. | |
| 5,307,704 | A | | 5/1994 | Muller | |
| 5,308,129 | A | | 5/1994 | Hlvaty | |
| 5,308,138 | A | | 5/1994 | Hlvaty | |
| 5,309,677 | A | | 5/1994 | Kunert et al. | |
| 5,351,443 | A | | 10/1994 | Kimura | |
| 5,355,629 | A | | 10/1994 | Kimura | |
| 5,363,595 | A | * | 11/1994 | Wirsing | 49/375 |
| 5,367,832 | A | | 11/1994 | Compeau et al. | |
| 5,410,921 | A | | 5/1995 | Deynet et al. | |
| 5,425,206 | A | | 6/1995 | Compeau et al. | |
| 5,577,347 | A | | 11/1996 | Heckel et al. | |
| 5,692,273 | A | | 12/1997 | Rodde | |
| 5,729,930 | A | * | 3/1998 | Schust et al. | 49/375 |
| 5,806,244 | A | | 9/1998 | Tilli | |
| 5,836,205 | A | | 11/1998 | Meyer | |
| 5,943,913 | A | | 8/1999 | Fenelon | |
| 5,966,872 | A | * | 10/1999 | Wasek et al. | 49/375 |
| 5,987,820 | A | * | 11/1999 | Shibanushi | 49/375 |
| 6,073,395 | A | | 6/2000 | Fenelon | |
| 6,125,588 | A | | 10/2000 | Schultz | |
| 6,131,339 | A | | 10/2000 | Ramus | |
| 6,145,252 | A | | 11/2000 | Fenelon | |
| 6,216,394 | B1 | | 4/2001 | Fenelon | |
| 6,389,753 | B1 | | 5/2002 | Fenelon | |
| 6,430,874 | B1 | | 8/2002 | Korte | |
| 6,453,617 | B1 | * | 9/2002 | Klippert et al. | 49/375 |
| 6,588,152 | B2 | * | 7/2003 | Cabbane | 49/375 |
| 2004/0154228 | A1 | | 8/2004 | Farrar et al | |

* cited by examiner .

WINDOW BRACKET FOR A WINDOW LIFT MECHANISM

FIELD OF THE INVENTION

The present invention relates generally to an apparatus for moving a window into an open or closed position. In particular, the present invention relates to a mechanism for use with an automobile window, wherein the mechanism utilizes an improved dual rack and pinion assembly and method of manufacturing.

BACKGROUND OF THE INVENTION

Modern automobiles typically include a window lift assembly for raising and lowering windows in the door of the vehicle. A common type of window lift assembly incorporates a "scissor mechanism" or a drum and cable mechanism. A scissor-type system utilizes a series of linkages in a scissor configuration such that as the bottom linkages move apart, the top linkages do as well, resulting in a scissor-like motion. The window is fastened to a bracket connected to a linkage. A motor and gearset drives the scissor mechanism in power operated window mechanisms.

The scissor-type and drum and cable mechanisms are typically mechanically inefficient, prohibiting the use of light-weight materials and requiring the use of relatively large motors to drive the system. The large motors necessarily require increased space and electrical power and also increase the weight of the system. With the limited space in a scissor-type or drum and cable system it is also necessary, in order to provide the required torque transfer efficiency and acceptable up and down times (3–4 seconds), to have a small diameter pinion gear, typically 0.5 to 0.75 inches, and relatively large worm gear, typically 1.8 to 2.5 inches in diameter, with gear ratios of 9 to 16 and 80 to 90, respectively. This results in excessive worm gear speed in the range of 3000 to 4000 RPM which causes excessive worm gear tooth shock and armature noise. The combination of high torque, typically 80 to 125 inch-pounds at stall, and shock due to high worm speeds mandates that either expensive multiple gears and/or single worm gears with integral shock absorbers be utilized.

Further, the scissor-type mechanism does not take into account the manufacturing deviations in the door, specifically with the window frame and mounting points, and deviations in the manufacture of the scissor-type mechanism. Deviations in the door and scissor-type mechanism result in larger than necessary forces being applied to the window when it cycles up and down. The larger force on the window causes undesirable noise in the passenger cabin.

Accordingly, a need exists for a window lift mechanism with increased efficiency that would allow for a reduction in the motor size and hence the mass of the system, and a support structure for the window that permits the window to find the path of least resistance when it cycles up and down.

SUMMARY OF THE INVENTION

The present invention provides a window lift mechanism that utilizes a dual rack and pinion drive mechanism that includes a motorized input from a worm shaft that drives a worm gear drivingly connected to one of the pinions of the dual rack and pinion system. A motor with the worm driveshaft and the pinions are supported by a base which traverses the dual rack structure when the dual pinions are driven. According to one aspect of the present invention, the window lift mechanism has two support structures each including a window bracket coupled to the window. The window brackets each include a channel for receiving the window therein. A pair of metal plates are disposed on opposite sides of the window bracket and include a clamping mechanism engaging each of the pair of metal plates for drawing the metal plates toward one another.

According to an alternative embodiment of the present invention, the window brackets are each provided with a wedge mechanism received in the channel for securing the closure member in the channel.

According to another aspect of the present invention, a method for assembling a window lift mechanism is provided including mounting a motor to a base, the motor including a worm drive shaft and worm gear meshingly engaged therewith. The method includes loading pinion gears into the base by placing the pinion gear onto a drive shaft connected to the worm gear and mounting the second pinion gear in the base. A dual rack assembly is then placed in alignment with the pinion gears and power is applied to the motor to drive the pinion gears to engage the pinion gears with the rack.

According to still another aspect of the present invention, the dual rack assembly is made as a modular unit including a base or frame structure which is adapted to be mounted to the door of the vehicle. The pair of rack members each including a plurality of gear teeth extending along the rack members are formed either as a molded unitary piece with the base structure, or are snap fit or otherwise fastened to the base structure for defining the modular unit.

According to yet another aspect of the present invention, the dual rack and pinion assembly is provided with a smart motor capable of detecting unusual forces applied to the window while being closed and capable of either shutting off or reversing drive of the motor. The system is further provided with one or more resilient shock absorbers operably engaged between the worm gear and pinion gears in order to allow the drive motor to have more time to react to unusual forces applied to the window.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
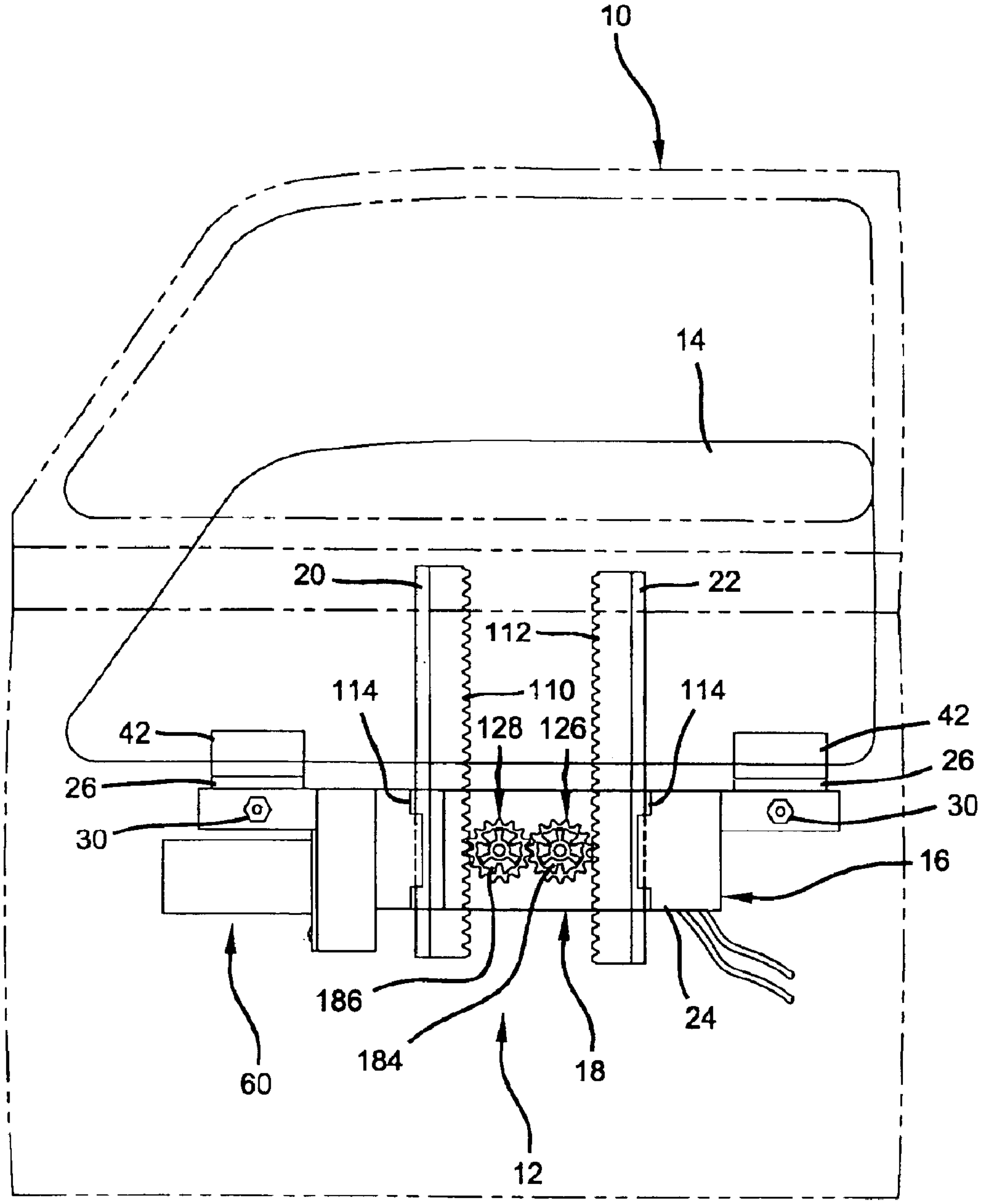
FIG. 1 is a schematic view of a window lift mechanism for an automobile door according to the principles of the present invention.

Referring generally to FIG. 1, a vehicle door 10 is shown schematically including a window lift mechanism 12. A window 14 is supported by the window lift mechanism 12 and is located within the automobile door 10. The window lift mechanism 12 includes a support structure 16 and a drive system 18. The drive system 18 is supported by the support structure 16 and serves to drive the support structure 16 relative to a pair of racks 20, 22 which are securely mounted to the door 10.

The support structure 16 includes a main bracket 24. According to a first embodiment, a pair of guide brackets 26 (best shown in FIGS. 3 and 4) are mounted to the main bracket 24 by a fastener 28 and a nut 30. The guide brackets 26 include a body portion 32 including an elongated vertical slot 34 for receiving the fastener 28. A pair of opposing stop flanges 36 extend from opposite sides of the body portion 32. An elongated semi-cylindrical guide portion 38 is disposed on an upper neck portion 40 of the guide bracket 26. The support structure 16 further includes a pair of window brackets 42 which are slidably engaged with the guide brackets 26.

Figure 4:
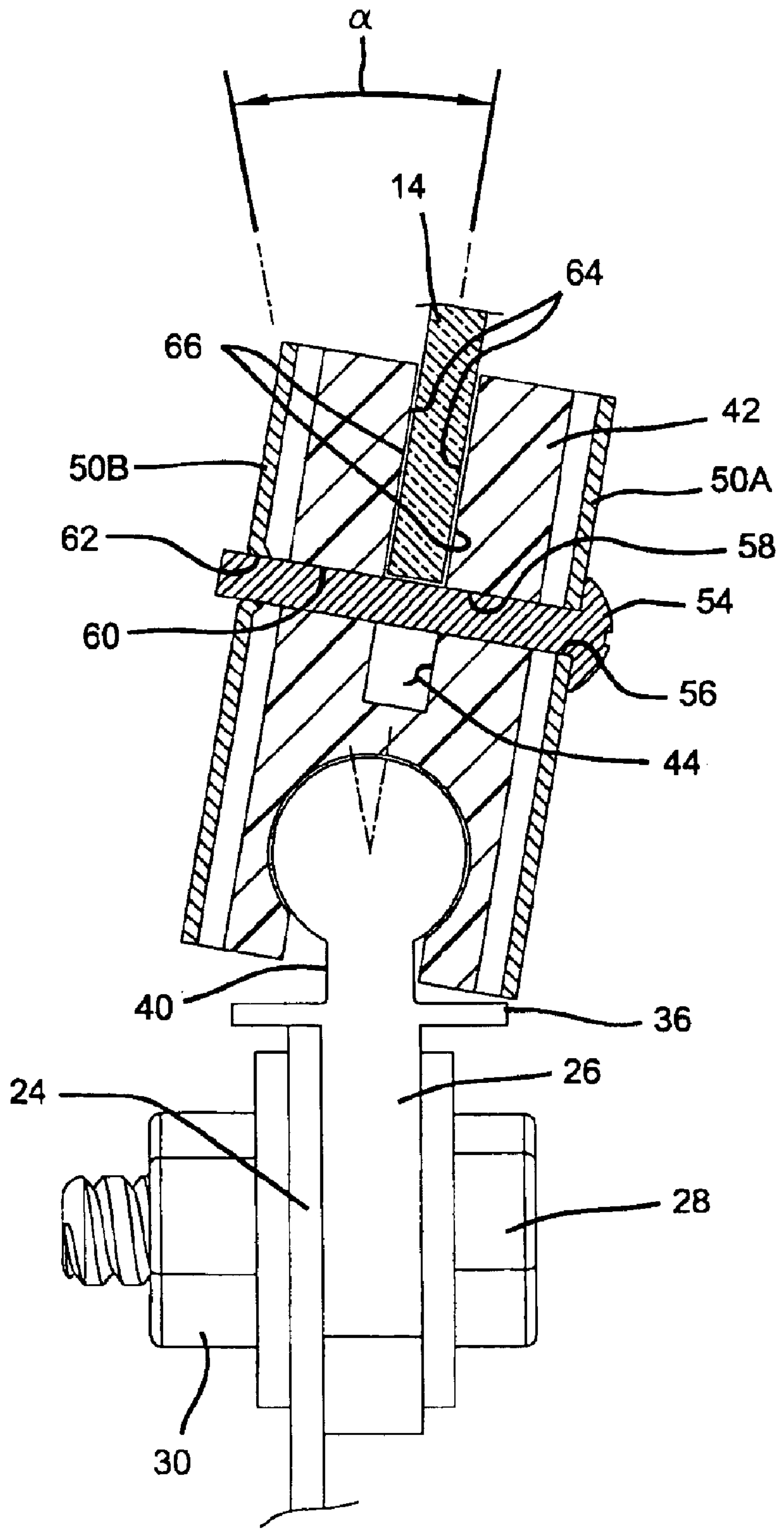
FIG. 4 is an end view of the support structure of FIG. 3 illustrating a cross-sectional view of the window clamp mechanism on the window bracket.

The window brackets 42 have a window channel 44 for receipt of the window 14 and a guide channel 46 having a semi-cylindrical inner surface for receiving the semi-cylindrical guide portion 38 of the guide bracket 26, as best shown in FIG. 4*a*. The guide channel 46 has an opening end portion 48 having a diameter greater than a width of the upper neck portion 40 of the guide bracket 26 so as to allow angular movement (∝) of the window bracket 42 relative to the guide bracket 26, as illustrated in FIG. 4. In FIG. 4, the window bracket 42 is shown tilted in a first forward position and is capable of being moved to a rearward tilted position, as illustrated by the angle∝. The window bracket 42 is able to pivot angularly by a predetermined angular amount ∝ (up to approximately 25°, preferably at least 20°), as well as sliding axially relative thereto in order to accommodate for variances in the door, support structure, and drive system. The interface between the opening 48 and upper neck portion 40, therefore provides the support structure 16 with two degrees of freedom with regard to the axial and rotational adjustment achieved by the guide bracket 26 and window bracket 42. By enabling the window bracket 42 to move with two degrees of freedom relative to the guide bracket 26, the window 14 is allowed to find the path of least resistance during opening and closing. In particular, the two degrees of freedom aids in overcoming unwanted imperfections in the door 10, window 14, support structure 16, and drive system 18. The movement of the window bracket 42 relative to the guide bracket 26 reduces the force placed on the drive system 18 and window 14, as well as reducing the noise generated by the window 14 and drive system 18.

Figure 3:
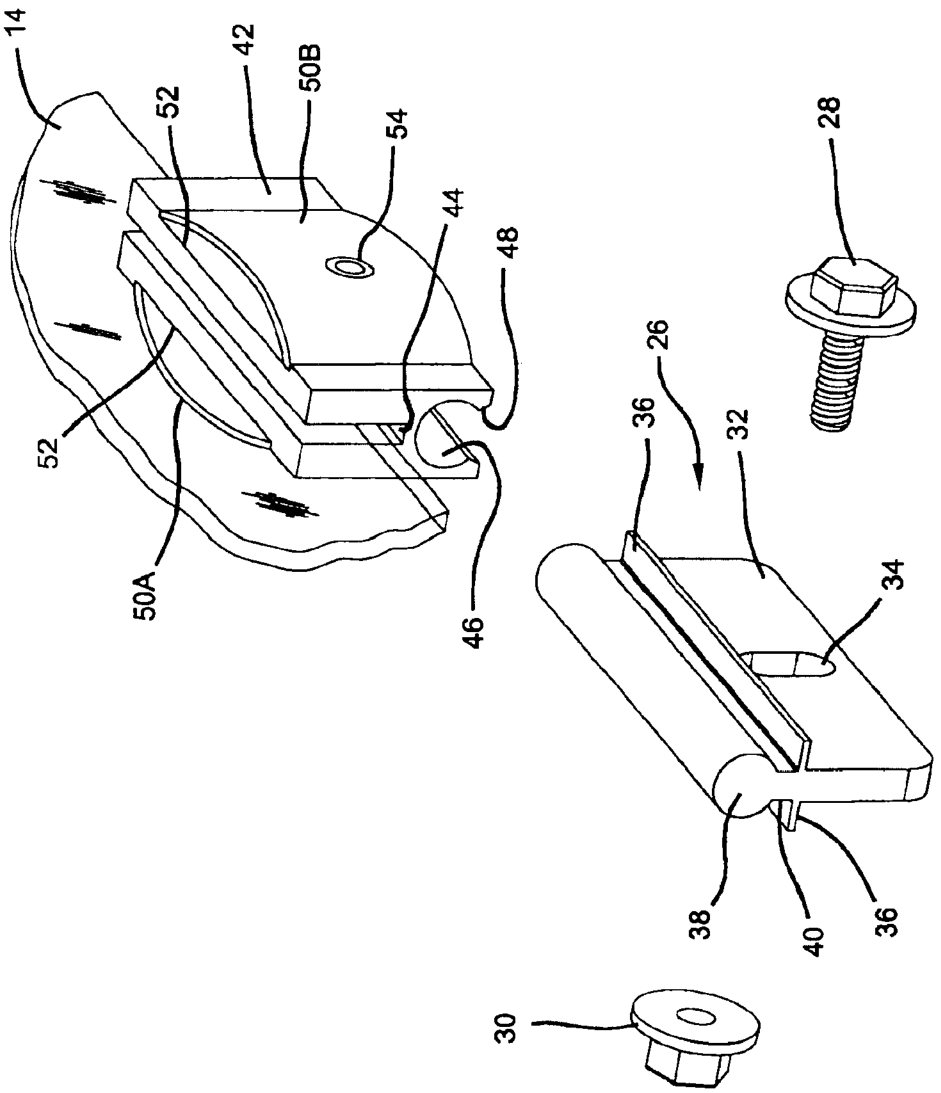
FIG. 3 is a perspective view of a support structure including a window clamp mechanism on the window bracket for the window lift mechanism according to the principles of the present invention.

As shown in FIG. 3, the window bracket 42 is mounted to the window by a pair of generally V-shaped metal plates 50A, 50B which are sandwiched on opposite sides of the window bracket 42. The window brackets 42 are provided with recessed channels 52 on opposing faces thereof for receiving the metal plates 50 therein. As best shown in FIG. 4, a threaded fastener 54 extends through an aperture 56 in the first metal plate 50A and through apertures 58 and 60 provided in the window bracket 42. The fastener 54 is threadedly engaged with an internally threaded aperture 62 provided in a second metal plate 50B. By tightening the threaded fastener 54, metal plates 50A, 50B are drawn inward against the side surfaces of the window bracket 42 causing the inner surface of the channel 44 to tightly engage the window 14. The inner sidewalls 64 of the channel 44 are provided with protruding engagement faces 66 at an upper end thereof for engaging the window 14. The recessed surfaces 52 provided on opposite faces of the window bracket 42 provide limit stops for the V-shaped metal plates 50A, 50B which act as spring members for applying a clamping force to the window bracket 42.

Figure 5:
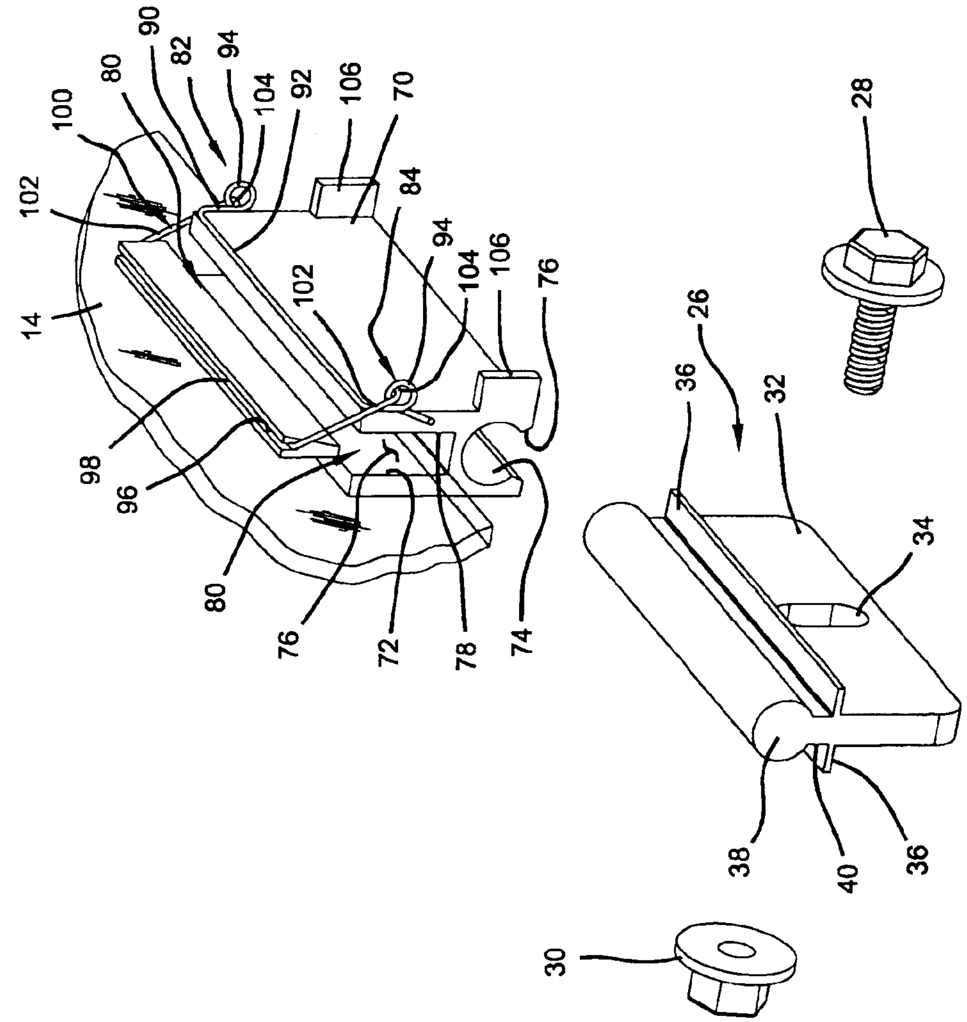
FIG. 5 is a perspective view of an alternative support structure including a window clamp mechanism on the window bracket for the window lift mechanism according to the principles of the present invention.
Figure 6:
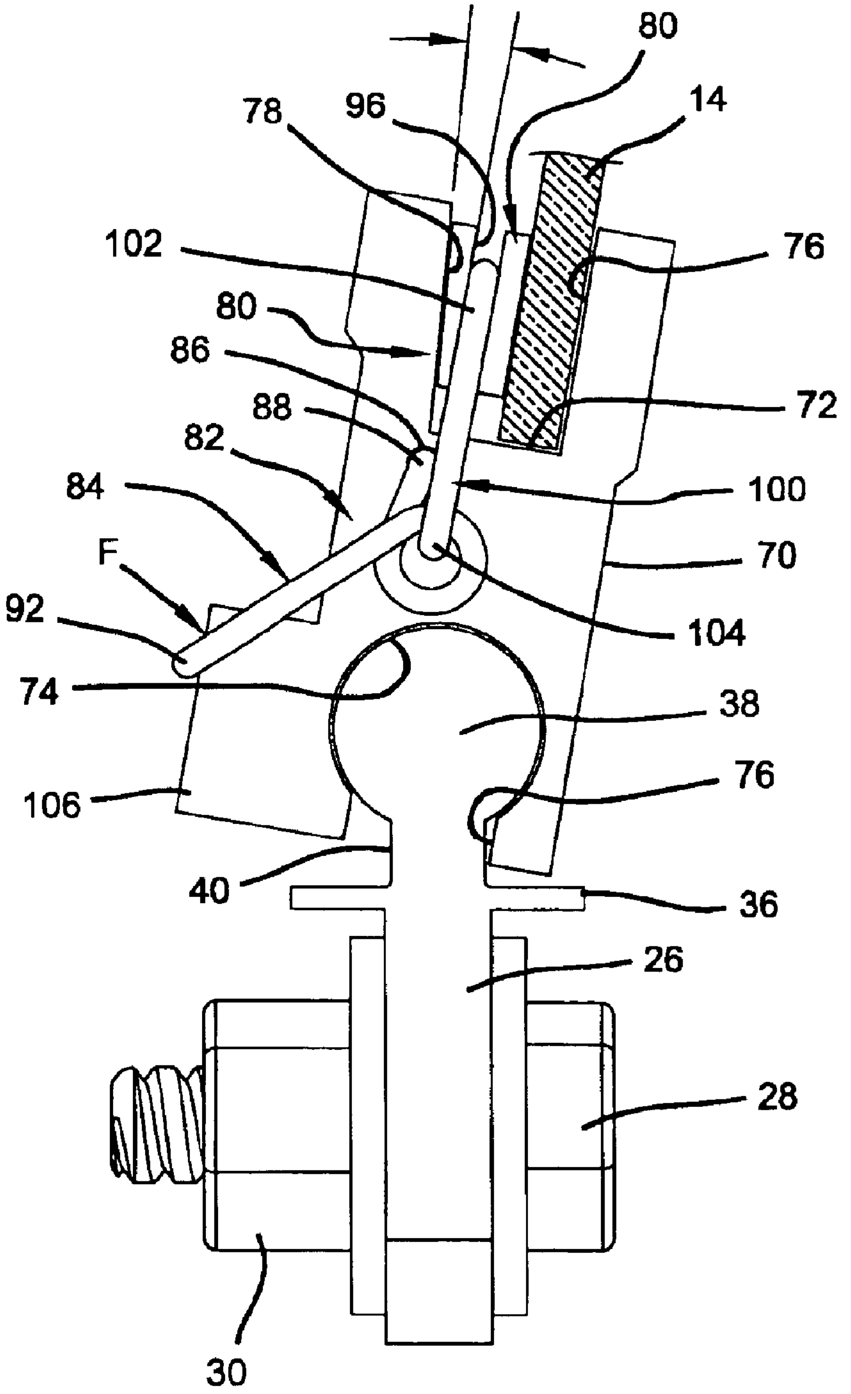
FIG. 6 is an end view of the support structure of FIG. 5 illustrating a cross-sectional view of the window clamp mechanism on the window bracket.

With reference with FIGS. 5 and 6, an alternative window bracket 70 is provided including a window channel 72 for receipt of the window 14 and a guide channel 74 having a semi-cylindrical inner surface for receiving the semi-cylindrical guide portion 38 of the guide bracket 26, as best shown in FIG. 5. The guide channel 74 has an opening end portion 76 having a diameter greater than a width of the upper neck portion 40 of the guide bracket 26 so as to allow angular movement of the window bracket 70 relative to the guide bracket 26, as illustrated in FIG. 6. The channel 72 is provided with a pair of opposing faces 76, 78. The face 78 is angled slightly relative to the face 76. A window 14 is inserted into the channel 72 and is disposed against the face 76 of the channel. A wedge member 80 is inserted in the channel 72 between the window 14 and angled face 78. The wedge member 80 is preferably made of an elastomeric material. A clamping device 82 is provided for applying force to the wedge member 80. The clamping device 82 includes an over-center toggle spring 84 pivotally mounted to the window bracket 70 via apertures 86. The over-center toggle spring 84 includes a pair of spring arms 90 disposed at opposite ends of a cross-bar 92. The spring arms 90 include two end tabs 88 which are received in the apertures 86. The spring arms 90 each include a spiral loop portion 94 which acts as a spring. The wedge member 80 is provided with an elongated channel 96 which receives a cross-bar portion 98 of a clamp wire 100 which includes a pair of opposite arms 102 which extend from the cross-bar portion 98, and each terminate in a hook portion 104 which engage the loop portions 94 of the toggle spring member 84.

During assembly, the window 14 is inserted in the channel 72 and the wedge member 80 is inserted next to the window 14 and sidewall 78 of the channel 72. The cross-bar 92 of toggle spring member 84 is then pulled downward from the position shown in FIG. 5 to the position shown in FIG. 6 until the cross-bar portion 92 of the toggle spring member 84 engages the laterally extending fingers 106 extending from the base of the window bracket 70. In this position, the toggle spring member 84 applies a spring force to the clamping wire 100 that in turn applies a clamping force to the wedge 80 which is biased tightly into the channel 72 for applying a force against window 14. Thus, in this manner, the window bracket 70 is easily mounted to the window 14 for securing the window 14 to the main bracket 24.

Figure 2:
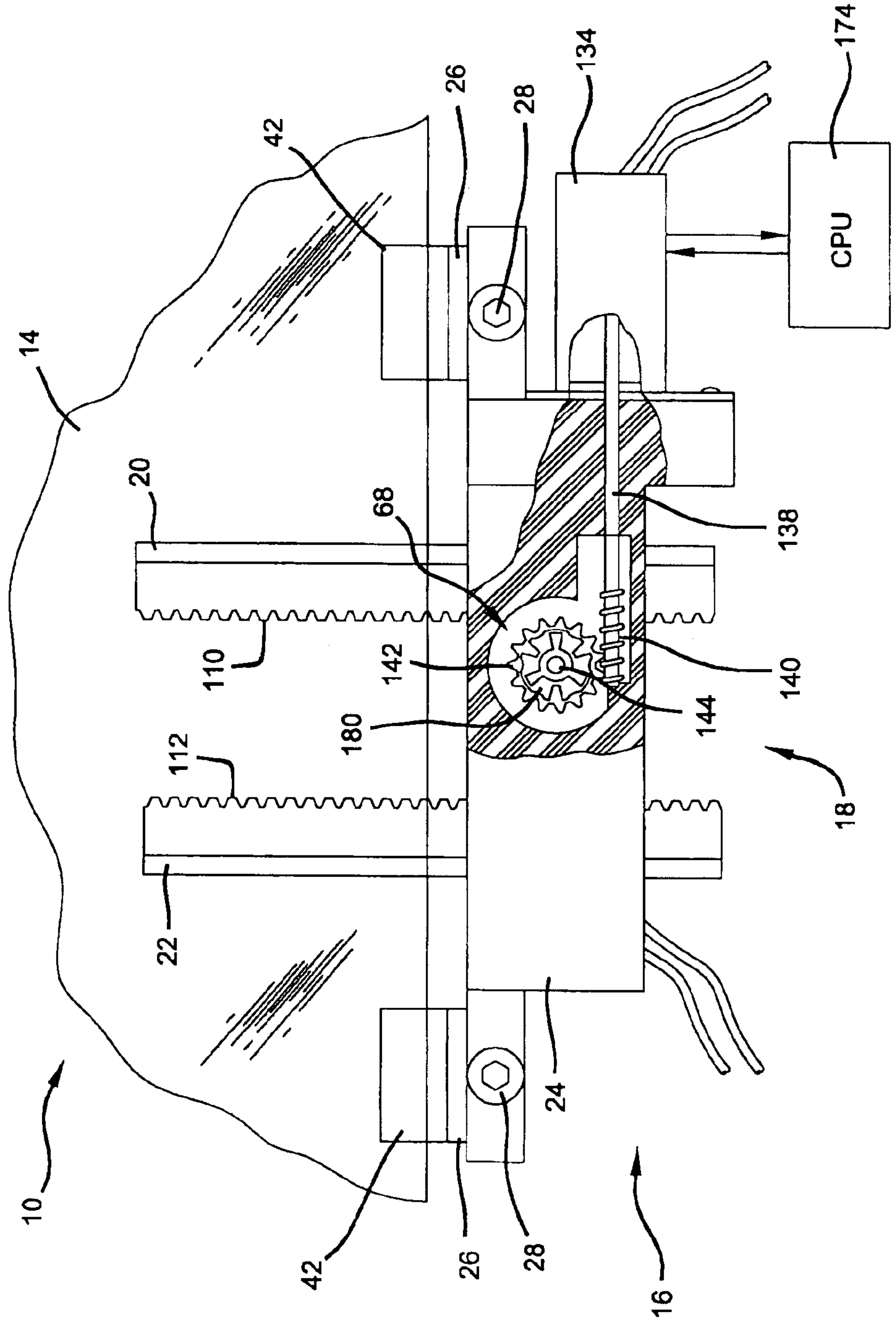
FIG. 2 is a partially cut-away view of the window lift mechanism according to the principles of the present invention.

Referring to FIG. 2, the main bracket 24 interacts with the racks 20, 22. The first rack 20 includes a row of teeth 110 which faces a row of teeth 112 on the second rack 22. Teeth 110 and 112 are in engagement with drive system 18 for raising and lowering the window 14. As shown in FIG. 1, guide members 114 are provided on the main bracket 24, adjacent to the first and second racks 20 and 22. Guide members 114 keep the first and second racks 20 and 22 in engagement with the drive system 18. Guide members 114 are generally plastic guide channels integrally formed with the main bracket 24.

Figure 7:
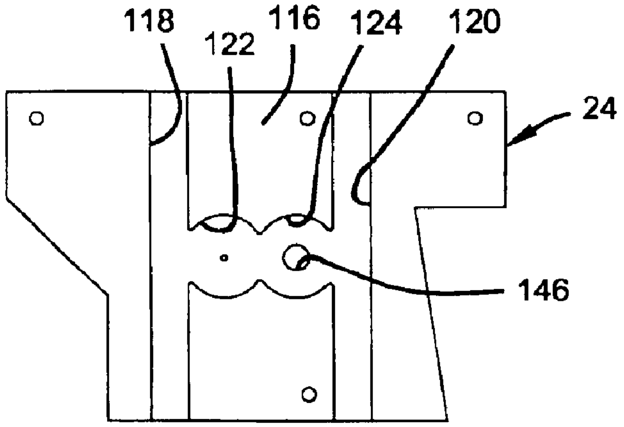
FIG. 7 is a plan view of the main bracket of the dual rack and pinion system according to the principles of the present invention.
Figure 8:
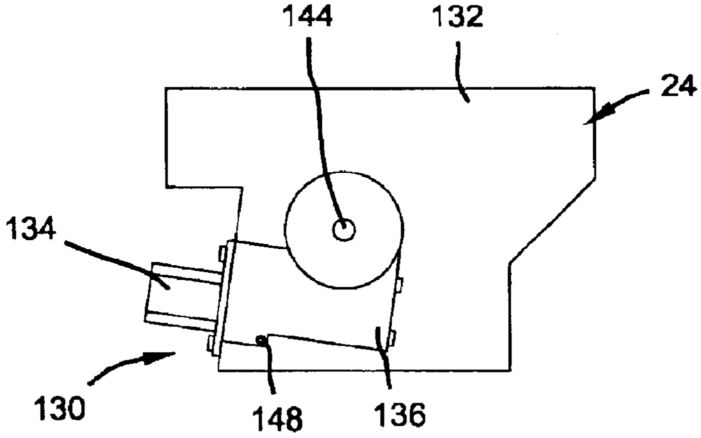
FIG. 8 is a front plan view of the main bracket having a motor assembly mounted thereto according to the principles of the present invention.
Figure 9:
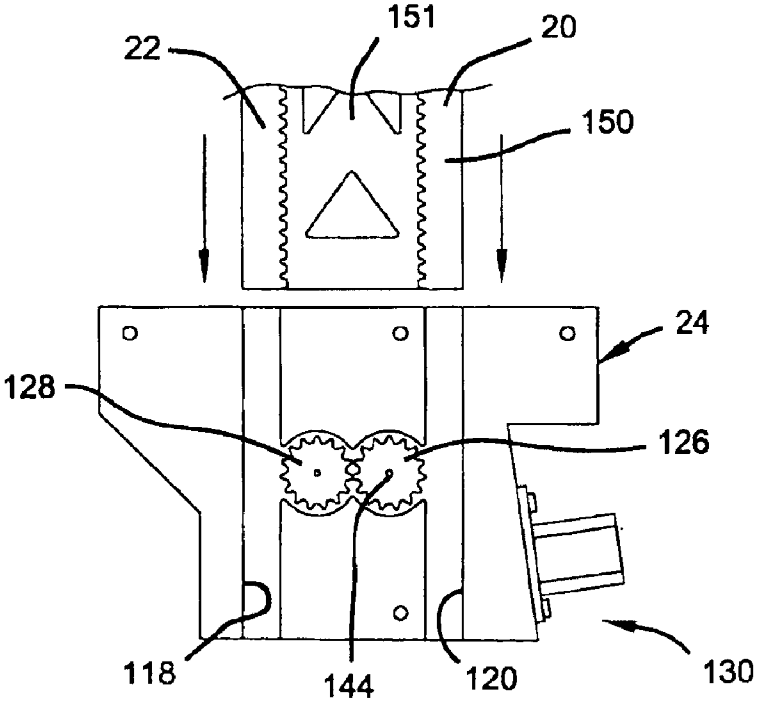
FIG. 9 illustrates the main bracket being mounted to the dual rack system by drivingly rotating the pinion gears therewith.
Figure 10:
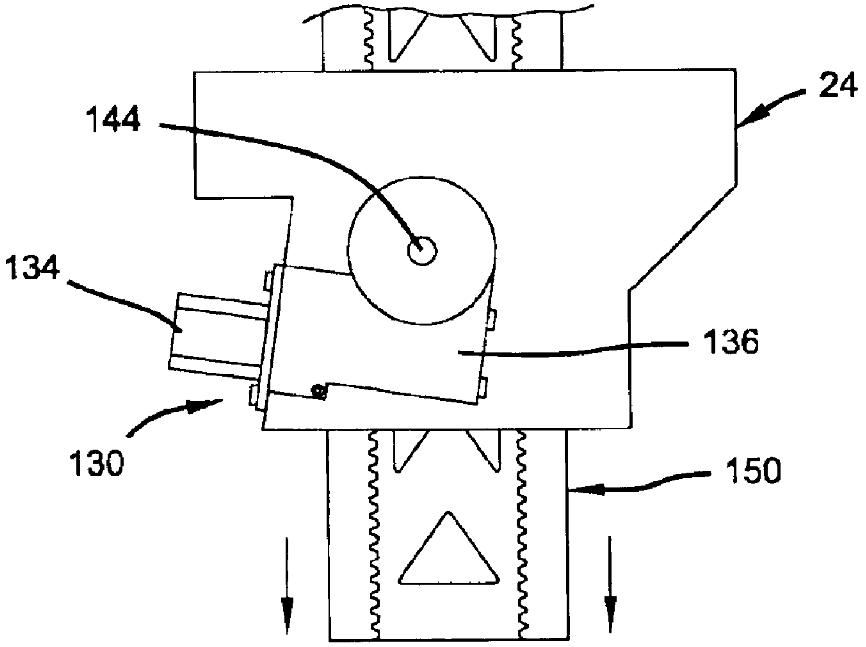
FIG. 10 is a front view of the dual rack and pinion system fully assembled according to the principles of the present invention.

With reference to FIGS. 1 and 2, a general description of the construction and operation of the dual rack and pinion window lift mechanism 12 will now be described. First, the main bracket 24, which is generally shown in FIGS. 1 and 2, is shown in a more preferred arrangement in FIGS. 7–10. In particular, as illustrated in FIG. 7, on a first face 116 of the main bracket 24, a pair of recessed channels 118, 120 are provided as well as recessed portions 122, 124 adapted to receive pinion gears 126, 128 of the drive system, as best illustrated in FIGS. 1 and 9. A motor housing assembly 130 is shown mounted to a second surface 132 of the main bracket 24 in FIG. 8. The motor housing assembly 130 includes a motor 134 connected to a housing 136. The motor 134 is provided with a drive shaft 138 (best illustrated in FIG. 2) having a worm 140 in meshing engagement with a worm gear 142. The worm gear 142 is supported on an axle 144 supported by the housing 136. The axle 144 connected to the worm gear 142 extends through an aperture 146 provided in the main bracket 24, as best illustrated in FIG. 7. During assembly, the motor housing assembly 130 is mounted to the main bracket 24 and is secured in place by threaded fasteners 148 (one of which is shown). After the motor housing assembly 130 is mounted to the main bracket 24, a drive pinion gear 126 is inserted in the recess portion 124 of the main bracket 24 and engaged with the drive spindle 144 of the worm gear 142. In addition, a slave pinion gear 128 is inserted in the recess portion 122 of the main bracket 24 and is in meshing engagement with the drive pinion gear 126. At this time, the motor 134 is connected to an electrical power source and a dual rack system 150 is brought into alignment with the channels 118, 120 of the main bracket 24 and inserted part way until the dual rack system 152 engages the pinion gears 126, 128. At this time, the motor 134 is driven in order to engage the pinion gears 126, 128 with the dual rack system 150, as best illustrated in FIG. 10. The motor is then driven to move the main bracket 24 and motor 134 to a predetermined position for convenient door installation. The dual rack system 150 includes a pair of elongated parallel racks 20, 22 each including a plurality of teeth extending therealong. A lattice-type cross brace structure 151 extends between, and is integrally molded as a unitary piece with, the pair of racks 20, 22. All of the components, except the motor, are made from high precision engineered thermoplastics.

Figure 11:
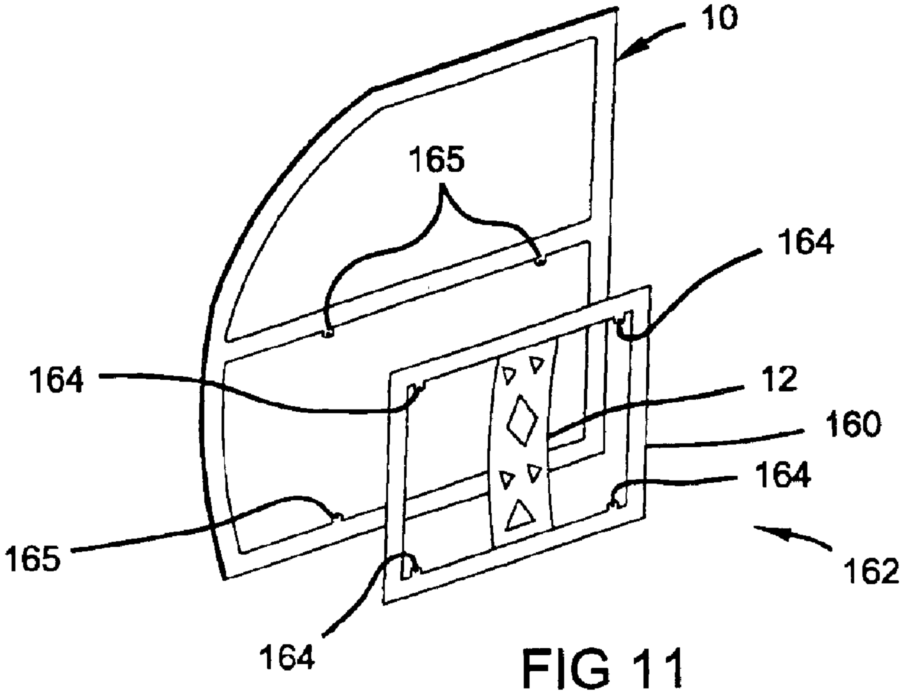
FIG. 11 is a perspective view of a modular dual rack and pinion system for mounting to a door of a vehicle.
Figure 12:
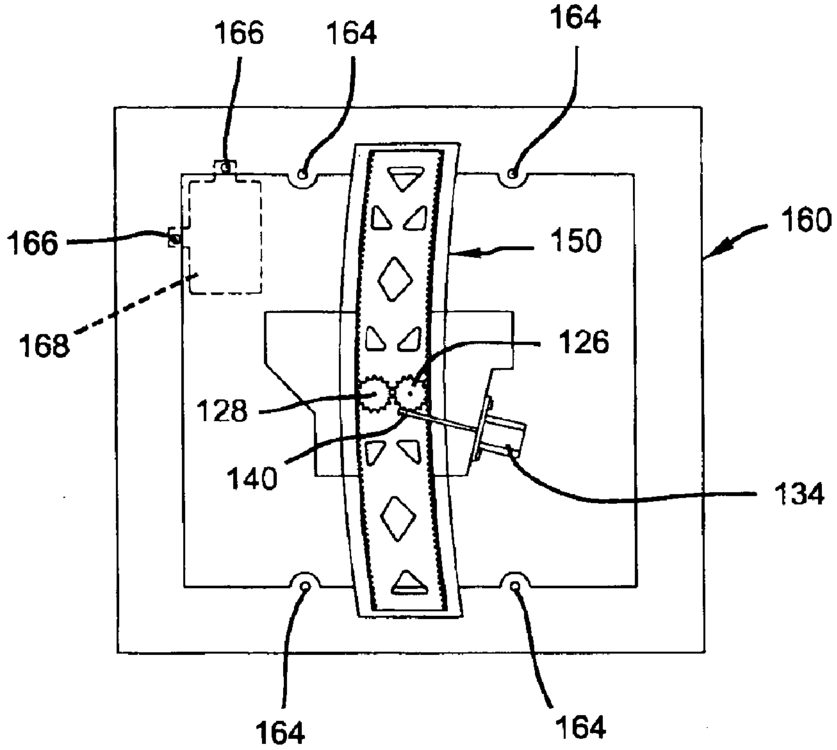
FIG. 12 is a detailed view of the modular dual rack and pinion system according to the principles of the present invention.

As illustrated in FIGS. 11–14, the dual rack and pinion window lift mechanism 12 is preferably mounted to a frame 160 that allows the frame 160 and window lift mechanism 12 to be mounted into a vehicle door as a modular unit 162, as best illustrated in FIG. 11. As shown in FIG. 12, the dual rack system 150 is preferably molded as an integral piece with the frame 160. The frame 160 is provided with mounting holes 164 which facilitate mounting the modular unit 152 to the vehicle door 10. The door 10 is provided with corresponding mounting holes 165 which are in alignment with mounting holes 164 on the frame 160. In addition, the frame 160 is provided with additional mounting holes 166, as illustrated in FIG. 12, to allow mounting of additional components 168 (shown in phantom) and that can include air bags, speakers, or other door components.

Figure 13:
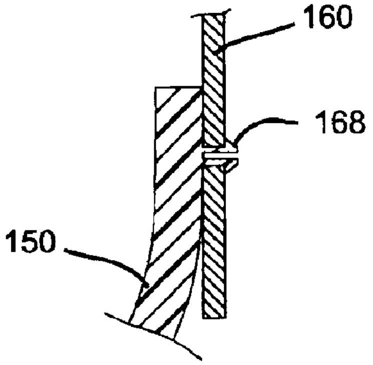
FIG. 13 illustrates a snap-fit engagement between a dual rack system to the frame of the modular assembly.
Figure 14:
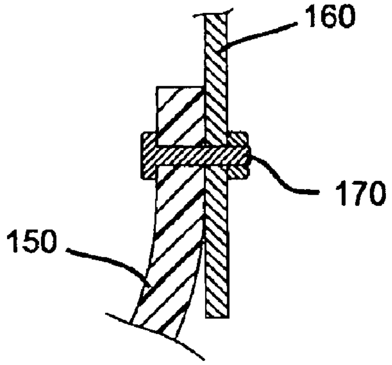
FIG. 14 shows the dual rack system being mounted to the frame of the modular dual rack and pinion system utilizing threaded fasteners.

As an alternative to molding the dual rack system 150 integrally with the frame 160, the dual rack system 150 can also be provided with snap-fit engagement for connection to the frame 160 by including snap insert members 168 as illustrated in the cross-section of FIG. 13, or fasteners 170 such as threaded bolts, screws, or rivets can also be utilized for connecting the dual rack system 150 to the frame 160 as illustrated in FIG. 14. The modular unit 162 facilitates easy installation of the window lift mechanism into the door of the vehicle. Once the modular unit 162 is installed in the door, the window 14 can be inserted in the channels provided in the window brackets 42/70, and the window brackets 42/70 are then clamped to the window 14, as described above.

A recent development in power window regulators are referred to as smart regulators, i.e., to have the capability of going up and down fast by touching the switch once. Due to automotive regulations, it is mandatory that on the way up, that from 4 inches to 0.1 inch from the top, the window must be capable of stopping and reversing prior to generating a force in excess of 100 Newtons. To achieve this, manufacturers have utilized sophisticated electronics and memory chips so that the window knows where it is at all times based on past or previous experience. In this way, if the window senses an object in its path, it will know that it is abnormal and hence, reverse. Essentially, detection methods are put in place by using memory chips employed within a controller 174, as illustrated in FIG. 2, so that deviation from a "learned reference" is known. These "learned references" are typically based on motor speed, motor current, or rate of change in speed (acceleration). Electronics used in combination with the memory chips utilize expensive componentry, such as a current shunt, multiple pull magnets, hall sensors, and commutator pulse detection sensors. The cost and performance of the smart units are dependent upon the time available for the motor to "detect and react" to where it was prior to generating forces greater than 100 Newtons. While various smart motor systems have been successfully adapted to arm and sector and cable units, a number of problems exist. Specifically, the design of these systems are such that varying degrees of slack are inherent, and this slack varies continuously and unpredictably over the life of those products. The mechanical inefficiency of those systems requires that larger motors than necessary, typically motors capable of achieving 90 inch pounds plus are utilized which leaves a greater amount of excess force to cause damage to objects that may obstruct the window in the event of malfunctioning of the smart system. Dual rack and pinion regulators are precision manufactured from injection molded engineered thermoplastic, which means that the degree of slack inherent in the system is repeatable, controllable, and based on experience gained, is constant over time. In order to increase the response time available to the smart motor system prior to reaching the 100 Newton force limitation, the dual rack and pinion system of the present invention is provided with a worm gear 142, drive pinion gear 126, and slave pinion gear 128 which are modified to act as shock absorbers. The shock absorbers slow down the pinch process so that a simplified smart motor may have more time to "detect and react" to any interruption in window upward movement.

Figure 15A:
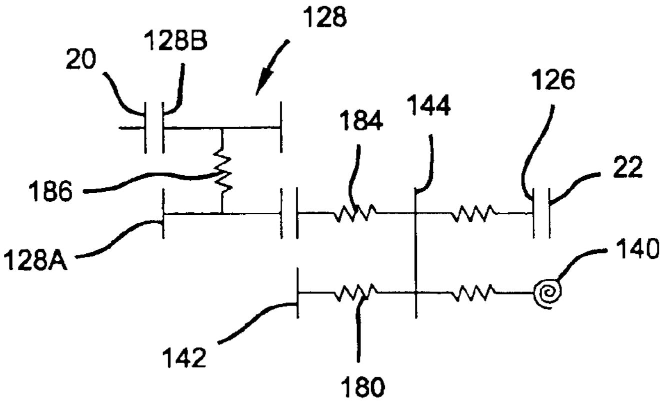
FIG. 15A is a schematic view of a dual rack and pinion system utilizing multiple resilient shock absorbers according to the principles of the present invention.
Figure 18:
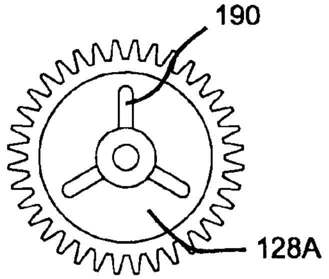
FIG. 18 is a plan view of one of the gear segments of the slave pinion gear of FIG. 16.
Figure 15B:
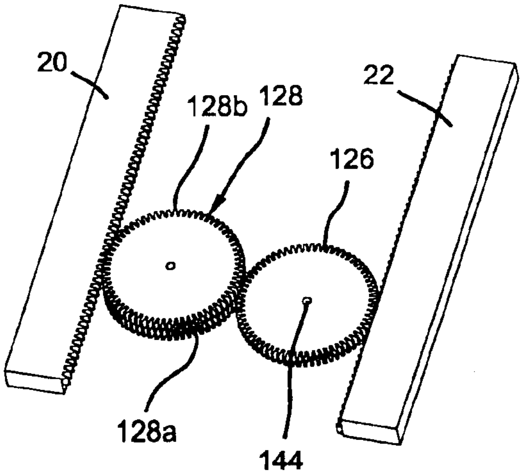
FIG. 15B is a partial perspective view of a dual rack and pinion system utilizing multiple resilient shock absorbers according to FIG. 15B.
Figure 17:
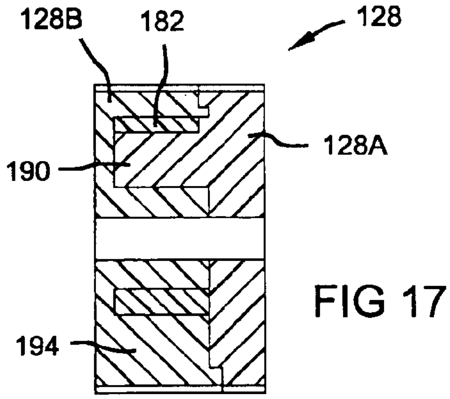
FIG. 17 is a cross-sectional view of the slave pinion gear of FIG. 16 in an assembled condition.
Figure 16:
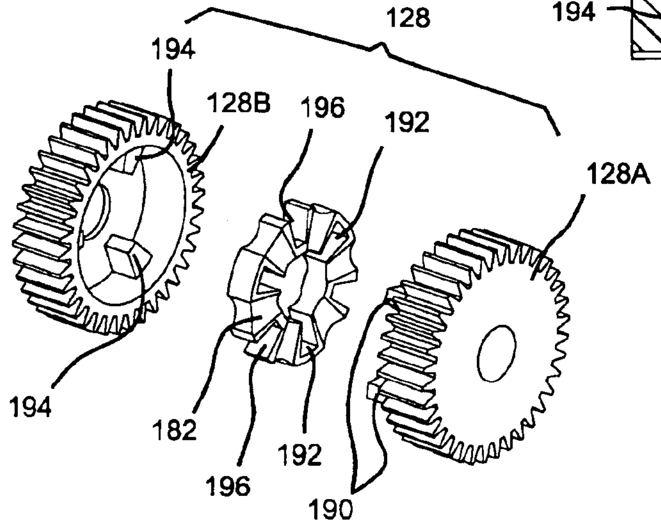
FIG. 16 is an exploded perspective view of a slave pinion gear as illustrated in FIG. 15.

With reference to FIGS. 15–18, a dual rack and pinion system utilizing multiple shock absorbers will now be described. As illustrated in FIG. 15A, a worm 140 is in driving engagement with a worm gear 142. The worm gear 142 is provided in driving engagement with a drive spindle 144 via resilient spring members 180 which can be in the form of elastomeric shock absorber 182 as illustrated in FIG. 16. The drive spindle 144 is drivingly connected to the drive pinion gear 126 via a second resilient spring member 184. As described previously, the drive pinion gear 126 is in driving engagement with the rack 22 of the dual rack assembly 150. Furthermore, the drive pinion gear 126 engages a first gear portion 128A of the slave pinion gear 128. The slave pinion gear 128 includes a second pinion gear portion 128B which is connected to the first pinion gear portion 128A via a resilient spring member 186. The second pinion gear portion 128B of the slave pinion gear 128 engages the rack 20 of the dual rack assembly 150. FIG. 15B illustrates a perspective view of the dual rack and pinion system shown in FIG. 15A. As shown in FIG. 15B, the racks 20, 22 are spaced apart relative to one another.

FIG. 16 illustrates an exploded perspective view of the construction of the slave pinion gear 128, as shown in FIG. 15A, 15B. In particular, the first gear portion 128A of the slave pinion gear 128 includes a plurality of axially extending fingers 190 which are received in radially outwardly extending recesses 192 of the resilient shock absorber 182. Furthermore, the second gear portion 128B of the slave pinion gear 128 includes a hollow body portion provided with radially inwardly extending fingers 194 which are received in radially inwardly extending recesses 196 of the elastomeric shock absorber 182. With this construction, the shock absorber 182 is capable of absorbing shock forces that are delivered between the first gear portion 128A and second gear portion 128B of the slave pinion gear 128.

With regard to the construction of the worm gear 142 and drive pinion gear 126, it is noted that each of these gears is constructed similar to second gear portion 128B of the slave pinion gear 128. In particular, each of these gears include radially inwardly extending fingers, such as fingers 194, which engage an elastomeric shock absorber such as shock absorber 182 illustrated in FIG. 16. The drive shaft 144 is provided at each end thereof with radially outwardly extending fingers, similar to fingers 190. It should be noted that other constructions using torsion springs or other elastomeric members having different configurations may also be utilized with the present invention. Similar systems utilizing stress dissipation technology are disclosed in commonly assigned U.S. Pat. Nos. 5,307,705, 5,452,622, and 5,943,913 for providing shock absorbance in a gear system.

Figure 19:
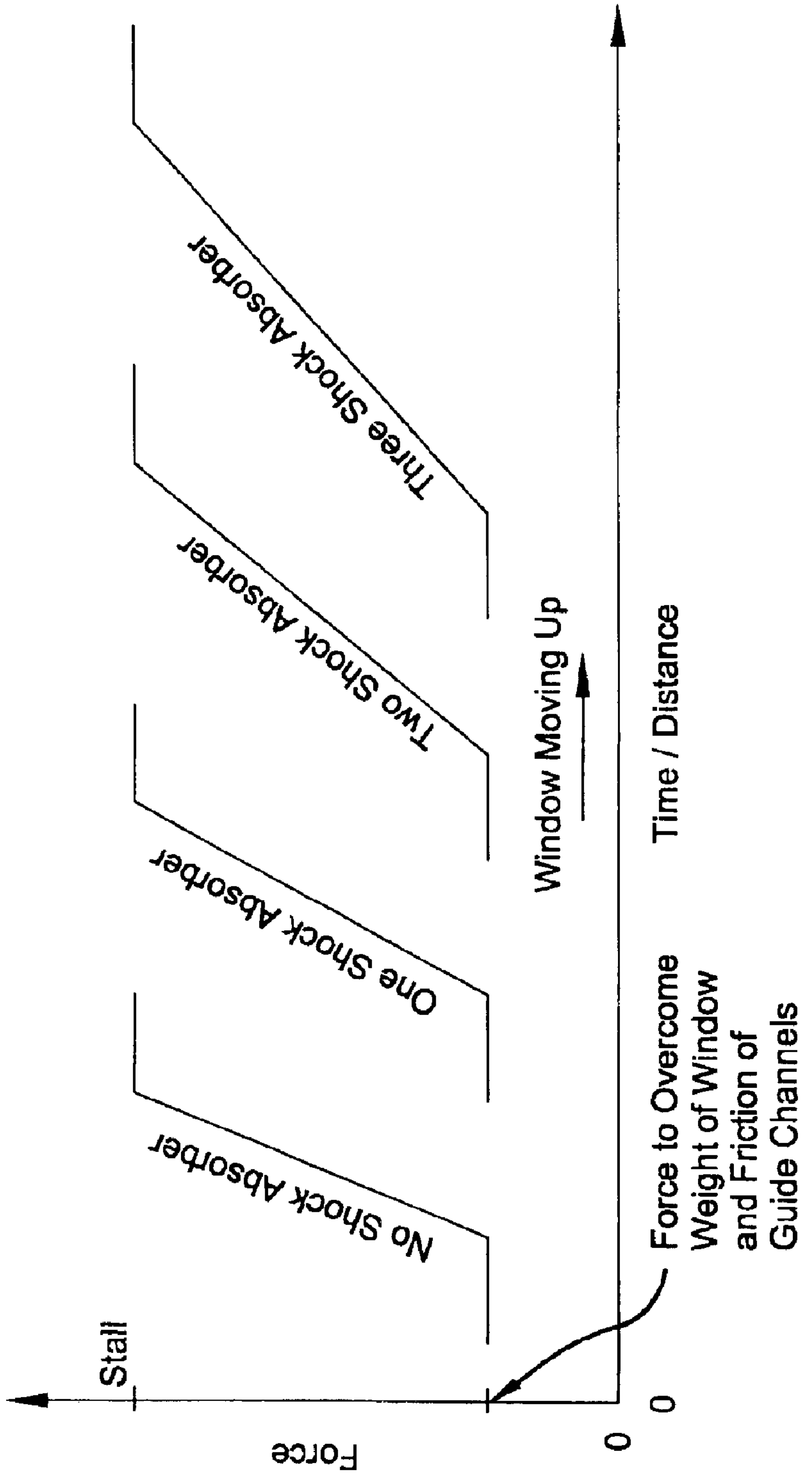
FIG. 19 is a graph illustrating the delayed force obtained in a smart motor window lift system utilizing multiple shock absorber according to the principles of the present invention.

When a shock absorber system is utilized in combination with a smart motor system and the upward moving window is obstructed and generates an impulse determined by force multiplied by time (Fxt) the shock absorbers increase the time factor, hence reducing the applied force at any point in time. With reference to FIG. 19, the influence of shock absorbent on the force versus distance/time plot as a window traverses up, is illustrated graphically for a dual rack and pinion system utilizing different numbers of shock absorbers (0–3). As illustrated in the drawings, the use of each additional shock absorber increases the time that is available prior to reaching a stall force for the motor. This increase in time, due to the use of multiple shock absorbers, increases the ability of a smart motor to prevent the window from reaching a predetermined maximum force level. Accordingly, the componentry of the smart motor can be reduced in complexity and cost due to the additional time allotted for reaction to the detected force. An additional benefit of the use of multiple shock absorbers is that they reduce the amount of vibration transferred from components of the gear train to the next and, therefore, reduce the noise generated by the dual rack and pinion system.

Figure 20:
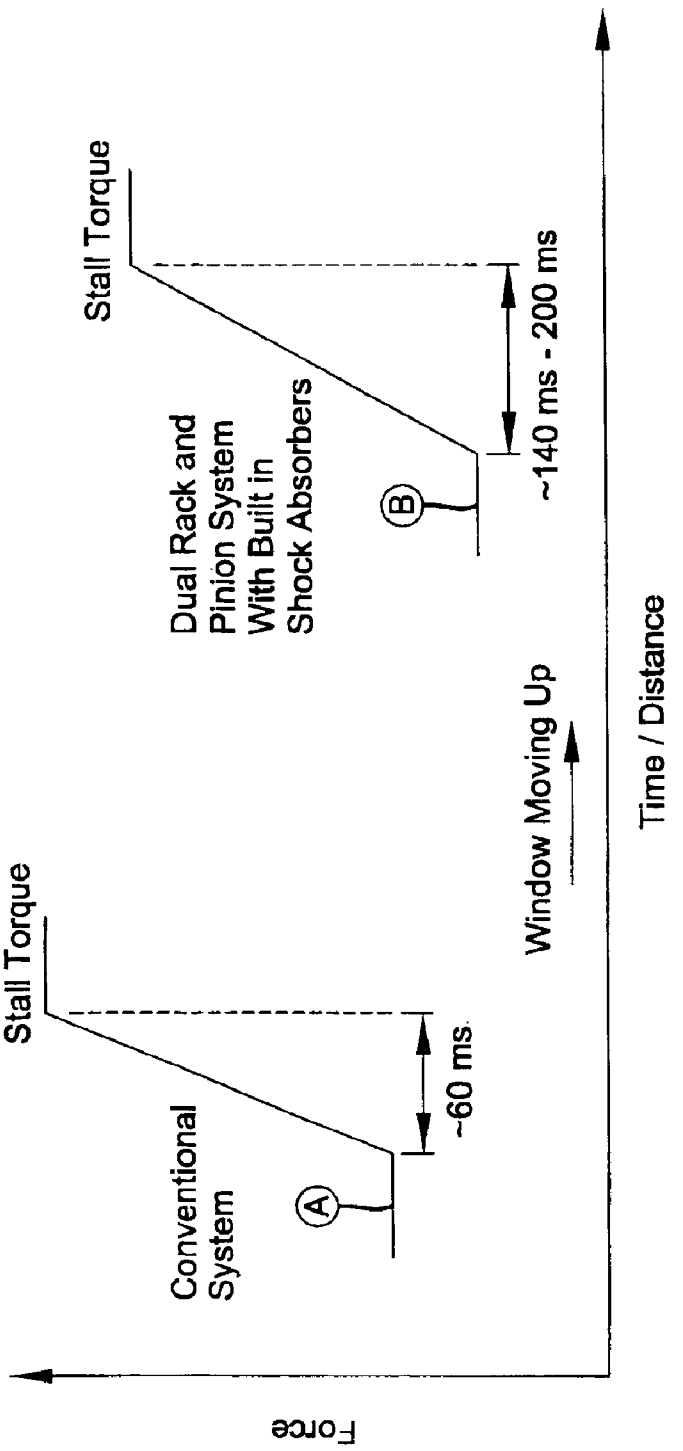
FIG. 20 is a graph providing a comparison of force-time distance plots as a window traverses up for a convention window lift mechanism versus a dual rack and pinion system with built-in shock absorbers according to the principles of the present invention.

FIG. 20 graphically illustrates a typical arm and sector and/or cable system as compared to the dual rack and pinion system with built-in shock absorbers. It is noteworthy that existing arm and sector and cable units also have shock absorbers built into the worm gear of the system. As illustrated in FIG. 20, typical arm and sector and/or cable systems require higher amounts of force which are required to overcome gravity and guide friction as illustrated by point A on the line representing the conventional system. In comparison, for the dual rack and pinion system with built-in shock absorbers, the amount of force required to overcome the window weight and guide channel resistance is significantly less as illustrated by point B. In addition, because of the increased efficiency of the dual rack and pinion system, the system can be provided with a smaller motor which reduces the amount of torque applied by the system and therefore, reduces the amount of potential torque that can be applied to an obstruction in the window. A typical dual rack and pinion system utilizes a motor which uses approximately 65 inch pounds of torque as compared to an arm and sector or cable system which utilizes a motor capable of producing upward of 90 inch pounds of torque. Finally, the amount of time from hitting an obstruction until a stall torque is obtained for a conventional system is approximately 60 milliseconds, whereas for the dual rack and pinion system this time is approximately 140 to 200 milliseconds when utilizing built-in shock absorbers. The more time provided for detection of an obstruction, allows the use of a less complex and hence, more economic smart regulator system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A closure assembly comprising:

a closure member;

a window bracket coupled to said closure member, said window bracket including a channel for receiving said closure member therein; and a pair of metal plates disposed on opposite sides of said window bracket and including a clamping mechanism engaging each of said pair of metal plates for drawing said metal plates toward one another, wherein each of said pair of metal plates includes a bend generally bisecting the metal plate so as to be generally V-shaped and applies a clamping force to said window bracket on a respective side of said channel.

2. The closure assembly of claim 1, further comprising a support member coupled to said window bracket and adapted to be driven for raising and lowering said closure member; and an interface between said window bracket and said support member permitting axial and pivotal movement of said closure member with respect to said support member.

3. The closure assembly of claim 2, wherein said interface includes a head portion on said support member which is slidably and rotatably received in a guide portion of said window bracket.

4. The closure assembly of claim 3, wherein said head portion is semi-cylindrical and said guide portion is semi-cylindrical.

5. The closure assembly of claim 1, wherein said window bracket includes a pair of recessed groove portions on each said side thereof for receiving opposite edges of a respective one of said pair of metal plates, said opposite edges of said pair of metal plates extending parallel to said bends.

6. The closure assembly of claim 1, wherein said clamping mechanism includes a threaded screw extending through each of said metal plates.

* * * * *